(12) United States Patent
Fukuta et al.

(10) Patent No.: US 7,388,923 B2
(45) Date of Patent: Jun. 17, 2008

(54) METHOD AND SYSTEM FOR ADAPTIVE CONTROL OF SUB-CARRIERS

(75) Inventors: Masaya Fukuta, Tokyo-to (JP); Hiroshi Hayashi, Nishitokyo (JP); Kevin Lynn Baum, Rolling Meadows, IL (US); Vijay Nangia, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 521 days.

(21) Appl. No.: 11/147,092

(22) Filed: Jun. 7, 2005

(65) Prior Publication Data

US 2006/0274839 A1 Dec. 7, 2006

(51) Int. Cl.
*H04K 1/10* (2006.01)
*H04J 11/00* (2006.01)
*H04B 7/208* (2006.01)

(52) U.S. Cl. .................... 375/260; 370/208; 370/337
(58) Field of Classification Search ............... 375/132, 375/133, 140, 141, 260; 370/208, 337, 344, 370/430
See application file for complete search history.

(56) References Cited

U.S. PATENT DOCUMENTS

2002/0118765 A1 8/2002 Nangia et al.
2004/0071239 A1* 4/2004 Kim et al. .................. 375/346
2006/0002451 A1* 1/2006 Fukuta et al. ............... 375/132

OTHER PUBLICATIONS

Sorger, U., Debroeck, I., and Schnell, M.: "Interleaved FDMA-A New Spread-Spectrum Multiple-Access Scheme", Proceedings of the 1998 International Conference on Communications, pp. 1013-1017.

* cited by examiner

*Primary Examiner*—Young T. Tse (57) ABSTRACT

A method and system for adaptive control of sub-carriers is useful for increasing frequency diversity gain to improve bit error rate performance in an Interleaved Frequency Division Multiple Access (IFDMA) system. The method includes selecting a combination of a Repetition Factor (RF) and a repetition block size (Q), from possible combinations of a RF and a Q, based on a number of users ($N_u$) (step 1405). A Spreading Factor (SF), Forward Error Correction (FEC) coding rate (R), or modulation order (M) based on the $N_u$ is then determined (step 1410). Control signals are then provided based on the RF and Q, and based on the SF, R, or M (step 1415).

20 Claims, 10 Drawing Sheets

METHOD AND SYSTEM FOR ADAPTIVE CONTROL OF SUB-CARRIERS

FIELD OF THE INVENTION

The present invention relates generally to adaptive control of a number of sub-carriers in an Interleaved Frequency Division Multiple Access (IFDMA) communication system.

BACKGROUND OF THE INVENTION

Future wireless communication systems will provide a wide range of services using a variety of access technologies. Such systems are often described as beyond third generation (B3G) systems and will include support for heterogeneous network access, communication service, user devices and mobility service. Modern networks are becoming increasingly diverse in their interconnectivity and transport capabilities, and B3G systems will need to be capable of managing even greater diversity. B3G systems may thus need to operate in an environment where almost all devices are networked, and almost all network entities are mobile.

B3G systems will first need to overcome many disadvantages associated with current technology. For example, in most wireless mobile communication systems a large frequency band is assigned to the whole system. The assigned frequency band is then shared by multiple users using multiple access techniques, such as Frequency Division Multiple Access (FDMA) and Code Division Multiple Access (CDMA). Both FDMA and CDMA systems operate in a frequency-selective propagation environment, where larger frequency diversity gain is obtained by assigning a wider frequency band to a user. However, FDMA systems allocate narrow frequency bands to low-rate users, and thus frequency diversity gain is not available to these users. CDMA systems provide a large frequency diversity gain, but suffer from Multiple Access Interference (MAI). Therefore, new B3G multiple access schemes, which provide both frequency diversity gain and orthogonality among multiple users, are desirable.

One B3G candidate technology is Interleaved Frequency Division Multiple Access (IFDMA). IFDMA is a scheme of orthogonal multiple access using spread spectrum techniques. A frequency band assigned to a system is divided into sub-carriers, and a different set of sub-carriers is assigned to each user. IFDMA provides frequency diversity gain by assigning multiple sub-carriers to a user while maintaining orthogonality between users.

In an IFDMA system, a mobile station requests a base station to activate a number of sub-carriers. The base station then activates a number of sub-carriers for the mobile station based on the requested number of sub-carriers. Generally, multiple mobile stations request such activation, and thus multiple sets of sub-carriers are activated simultaneously. However, all possible sub-carriers are not always activated. That is because the system bandwidth and sub-carrier spacing are generally constant, which means that the maximum number of sub-carriers is also constant. So when the total number of requested sub-carriers is smaller than the maximum number of sub-carriers, a base station will not need to activate all sub-carriers. But when all sub-carriers are not activated IFDMA systems are not always able to obtain full frequency diversity gain, resulting in sub-optimal performance.

BRIEF DESCRIPTION OF THE DRAWINGS

In order that the invention may be readily understood and put into practical effect, reference will now be made to exemplary embodiments as illustrated with reference to the accompanying figures, wherein like reference numbers refer to identical or functionally similar elements throughout the separate views. The figures together with a detailed description below, are incorporated in and form part of the specification, and serve to further illustrate the embodiments and explain various principles and advantages, in accordance with the present invention, where.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to adaptive control of a number of sub-carriers in an Interleaved Frequency Division Multiple Access (IFDMA) communication system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

IFDMA is a spread spectrum multiple-access scheme, which discriminates among multiple users by employing FDMA techniques. IFDMA divides a given frequency band into multiple sub-carriers, and assigns a part of the sub-carriers to each user. That process is performed using IFDMA modulation and demodulation schemes.

Figure 1:
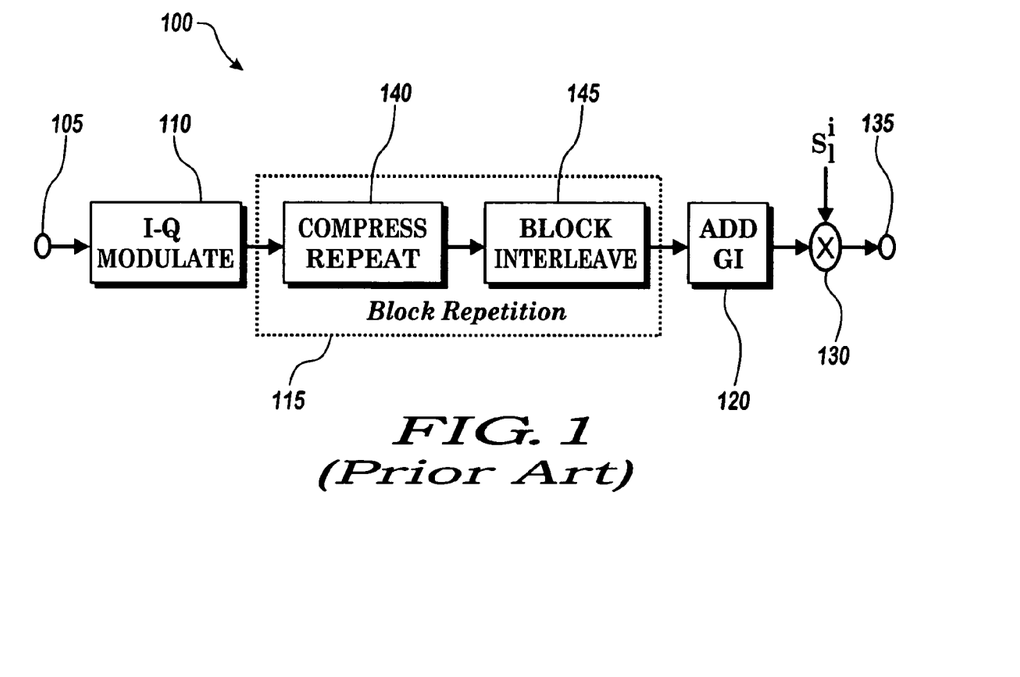
FIG. 1 is a schematic diagram of an IFDMA modulator according to the prior art.

Referring to FIG. 1 there is a schematic diagram of an IFDMA modulator 100 according to the prior art. A transmitted bit sequence is first entered into an input-port 105. An I-Q modulator 110 then performs I-Q modulation by mapping the bit sequence onto an I-Q constellation. The details of the I-Q modulation are not provided here as those skilled in the art will recognize that it can be performed by various well-known modulation schemes such as Quadrature Phase Shift Keying (QPSK), M-ary Quadrature Amplitude Modulation (MQAM), etc. A block repeater 115 converts the modulated symbol sequence to a chip sequence by a block repeat operation. A Guard Interval (GI) adder 120 then inserts a guard interval. Next, a multiplier 125 multiplies the repeated chips by a user-dependent frequency shift vector $s^i_l$. Finally, a base band signal is extracted from the output port 135.

The block repeater 115 comprises a compress repeater 140 and a block interleaver 145. The compress repeater 140 divides a modulated symbol into a specified number of repeated chips. The specified number of repeated chips is denoted by a repetition factor (RF). The block interleaver 145 interleaves the repeated chips with a Q×RF matrix, where Q is a repetition block size. The interleaving creates a block size that is defined as the product of Q and RF, which is also equal to the total number of sub-carriers ($N_{sub}$). The block interleaving is performed using row-wise writing and column-wise reading, where the numbers of rows and columns are equal to Q and RF, respectively.

After the block interleaving, the GI adder 120 inserts a guard interval at the beginning of the interleaving block, which consists of Q×RF chips. The guard interval is filled with the last v chips in the interleaving block, where v is the guard interval represented as a number of chips. In IFDMA systems, a block of interleaved chips with a guard interval is transmitted as one IFDMA symbol (v+Q×RF chips).

Figure 2:
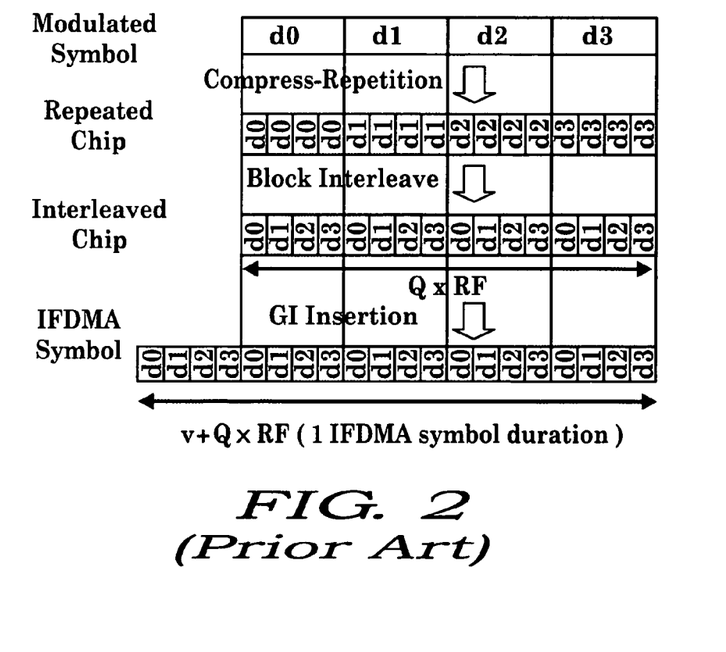
FIG. 2 is a schematic illustration of an IFDMA modulation process according to the prior art.

Referring to FIG. 2 there is a schematic illustration of an IFDMA modulation process according to the prior art, where RF=4 and v=Q=4. FIG. 2 illustrates the change from modulated symbols to repeated chips, to interleaved chips and finally to the IFDMA symbols.

Referring again to FIG. 1, the multiplier 130 multiplies an interleaved chip sequence with the user-dependent frequency shift vector $s^i_l$, in order to provide a user-dependent frequency offset. The user-dependent frequency shift vector for user i for chip l is given by the following equation:

$$s^i_1 = e^{-j \cdot 1 \cdot \Phi(i)} (1 = -v, -v+1, \cdots \qquad \text{(Eqn. 1)}$$
$$0, 1, \cdots, Q \times RF - 1, i = 0, 1, \cdots, RF - 1),$$
where,
$$\Phi(i) = i \cdot \frac{2\pi}{Q \cdot RF}. \qquad \text{(Eqn. 2)}$$

$\Phi(i)$ is a user-dependent frequency offset in number of sub-carriers, and $s^i_l$ is a time variant phase vector. Therefore, multiplying the interleaved chip sequence with $s^i_l$ provides a frequency shift with a user-dependent frequency offset. The frequency-shifted chip sequence is then extracted from output port 135.

Figure 3:
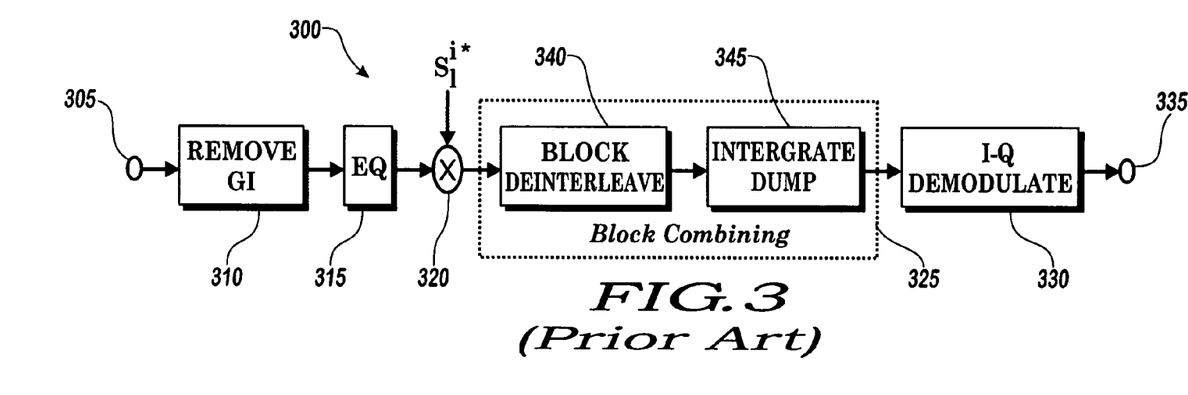
FIG. 3 is a schematic diagram of an IFDMA demodulator according to the prior art.

Referring to FIG. 3 there is a schematic diagram of an IFDMA demodulator 300 according to the prior art. A received base band signal of an IFDMA system is first entered into an input port 305. A GI-remover 310 removes v chips of the guard interval and enters the GI-removed chips into an equalizer 315. The equalizer 315 equalizes the received base band signal in order to mitigate multi-path interference.

The equalization may be achieved by using a Minimum Mean Squared Error (MMSE) filter with frequency response according to the following formula:

$$G[n] = \frac{H^*[n] \cdot S_x[n]}{|H[n]|^2 \cdot S_x[n] + S_n[n]}, \qquad \text{Eqn. 3}$$

where,
H[n] is a frequency response of a propagation channel,
$S_x[n]$ is a power spectral density of the IFDMA signal, and
$S_n[n]$ is a power spectral density of additive noise.

Multiplier 320 multiplies the equalized signal with the conjugate of the user-dependent frequency shift vector $s^i_l$, in order to recover the user-dependent frequency offset. A block combiner 325 then combines the repeated chips to compose the modulated symbols. An I-Q demodulator 330 then extracts the bit sequence from the modulated symbols, and enters the bit sequence into an output port 335.

The block combiner 325 comprises a block deinterleaver 340 and an integrate dumper 345. The block deinterleaver 340 deinterleaves the phase-recovered chip sequence using a Q×RF block deinterleaver. The integrate dumper 345 integrates RF chips and then dumps once every RF chips.

Figure 4:
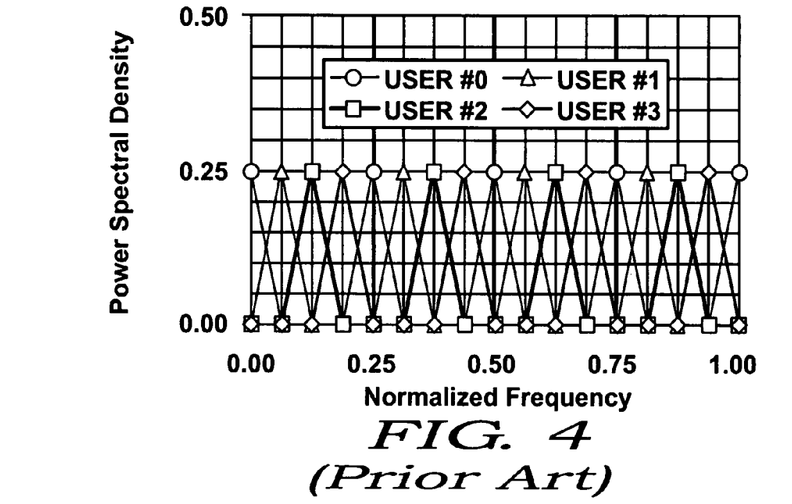
FIG. 4 is a graph illustrating an example of a prior art IFDMA signal power spectrum involving four users.

Referring to FIG. 4 there is a graph illustrating an example of a prior art IFDMA signal power spectrum involving four users. Both Q and RF are set to 4. The number of possible sub-carriers is given by the product of Q and RF, and the number of active sub-carriers for each user is equal to Q. The user dependent frequency shift vector provides orthogonality among multiple users in the frequency domain.

In a cellular system using IFDMA, a mobile station requests a base station to activate a number of sub-carriers. The base station then activates a number of sub-carriers for the mobile station based on the requested number of sub-carriers. Generally, multiple mobile stations request the activation, and multiple sets of sub-carriers are activated. However, as discussed previously all the possible sub-carriers are not always activated. Therefore, prior art IFDMA systems cannot obtain full frequency diversity gain.

Figure 5:
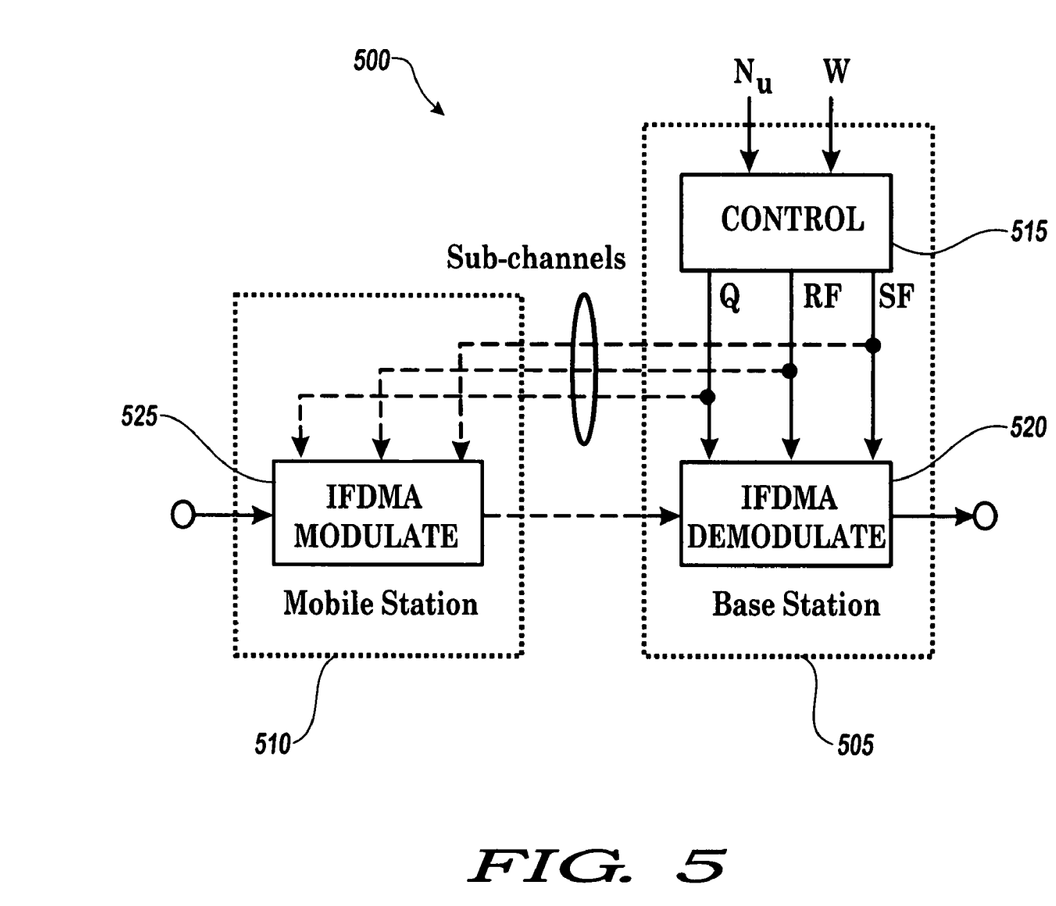
FIG. 5 is a schematic diagram of an IFDMA system according to an embodiment of the present invention.

Referring to FIG. 5 there is a schematic diagram of an IFDMA system 500 according to an embodiment of the present invention. In order to obtain full frequency diversity gain, the system 500 performs adaptive control of a required number of active sub-carriers. The system 500 includes a base station 505 and a plurality of mobile stations 510 assigned to a plurality of users (for illustration purposes only one mobile station 510 is shown in FIG. 5). According to an exemplary embodiment of the present invention, the number of active sub-carriers assigned to each user is adaptively controlled to increase, and preferably maximize the total number of active sub-carriers. The adaptive control is performed by adjusting the Repetition Factor (RF) and repetition block size (Q) based on a number of users ($N_u$), or based on both $N_u$ and a requested number of sub-carriers (W). A Spreading Factor (SF) is also controlled to adjust redundancy of transmitted data. Because the total number of active sub-carriers is increased compared to a conventional IFDMA system, the system 500 obtains increased and potentially full frequency diversity gain—resulting in improved bit error rate performance compared to the prior art.

Embodiments of the present invention are applicable to broadband wireless communication systems such as wireless Local Area Networks (LANs) and next generation (4G and B3G) cellular systems. Embodiments of the present invention are also suitable to circumstances such as 4G uplink systems and Super 3G uplink methods using Variable Spreading Chip Repetition Factor (VSCRF)-CDMA, which is a combination of IFDMA and spreading.

The base station 505 of the system 500 includes a controller 515 and an IFDMA demodulator 520. The controller 515 provides the RF, Q and SF parameters both to an IFDMA modulator 525 in a mobile station 510 and to the IFDMA demodulator 520. When the IFDMA system 500 is applied to an uplink of a cellular system, both the IFDMA demodulator 520 and controller 515 may be included in a base station 505. In such circumstances, the RF, Q and SF parameters may be transmitted through sub-channels to the IFDMA modulator 525 in the mobile station 510.

Figure 6:
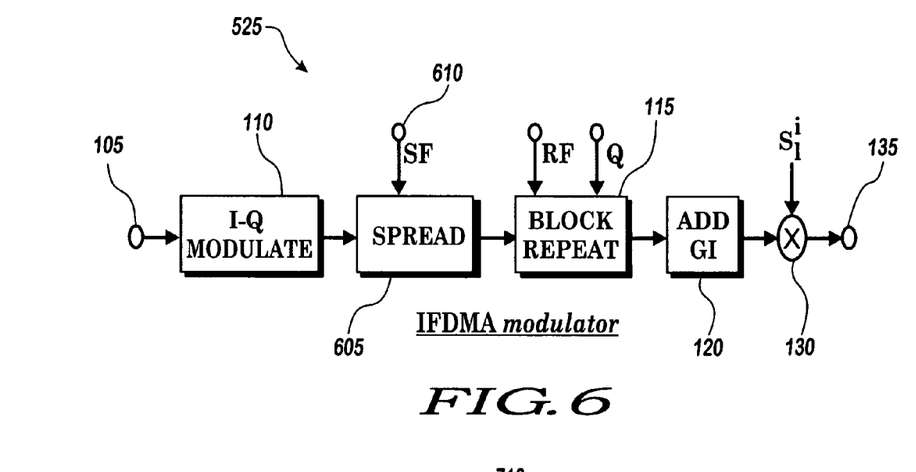
FIG. 6 is a schematic diagram of components of an IFDMA modulator according to an embodiment of the present invention.

Referring to FIG. 6 there is a schematic diagram of components of an IFDMA modulator 525 according to an embodiment of the present invention, which shows the addition of a spreader 605 to the standard components of a prior art IFDMA modulator 100 such as is illustrated in FIG. 1. The spreader 605 receives from the controller 515 the SF parameter at an input 610 and repeats, for SF repetitions, the modulated symbols from the I-Q modulator 110. Following the repetition the repeated symbols can be multiplied by spreading codes, such as orthogonal codes and Pseudo Noise (PN) codes, as are well known to those skilled in the art. Although not shown in FIG. 6, it is also possible to implement an IFDMA modulator with frequency-domain based processing wherein the block repeat 115 is replaced with an IDFT to take the data block into the frequency domain, a mapper to map the frequency domain data to the desired IFDMA subcarrier locations while setting the remaining subcarrier inputs to zero, and a DFT to transform the signal back to the time domain.

Figure 7:
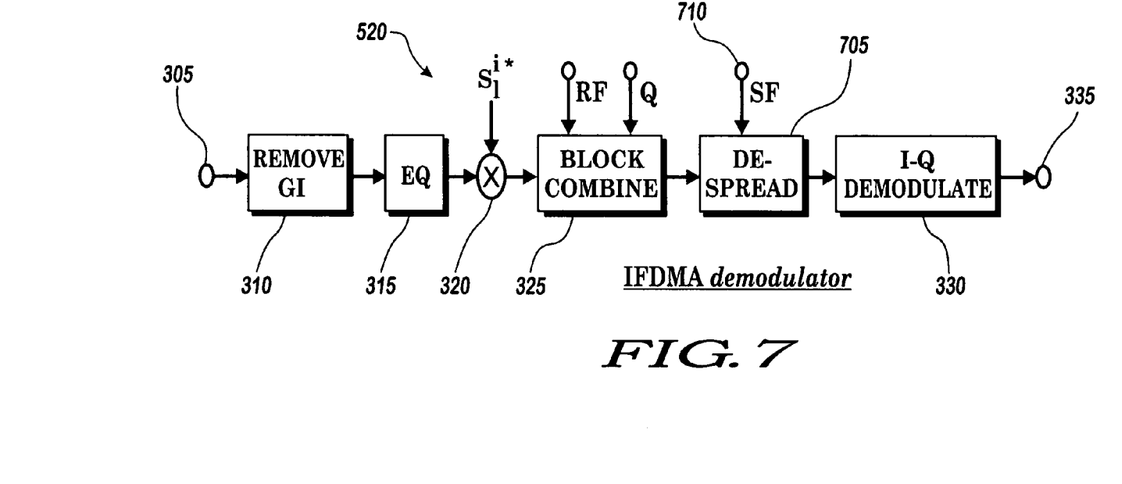
FIG. 7 is a schematic diagram of components of an IFDMA demodulator according to an embodiment of the present invention.

Referring to FIG. 7 there is a schematic diagram of components of an IFDMA demodulator 520 according to an embodiment of the present invention, which shows the addition of a despreader 705 to the standard components of a prior art IFDMA demodulator 300 such as is illustrated in FIG. 3. The despreader 705 receives from the controller 515 the SF parameter at an input 710 and then multiplies the block-combined chips by the spreading codes (where the spreading was performed at an IFDMA modulator 525 according to an embodiment of the present invention). The despreader 705 accumulates the block-combined chips from the block combiner 325 before they are entered into the I-Q demodulator 330. Although not shown in FIG. 7, it is also possible to implement an IFDMA demodulator with frequency-domain based processing, as was described for the transmitter in FIG. 6.

According to an embodiment of the present invention, in order to at least increase and preferably maximize a number of active sub-carriers, the controller 515 adaptively controls the RF and Q. The SF is also controlled adaptively so to adjust the redundancy of transmitted data. For example the controller 515 might specify a higher Q than a particular mobile station 510 requires, which effectively assigns excessive bandwidth to the mobile station 510. The controller 515 may then increase the SF in order to increase redundancy of data transmitted from that particular mobile station 510.

Following are descriptions of two examples of adaptive control according to two different embodiments of the present invention.

EXAMPLE 1

In a first example, the RF and Q are adaptively controlled according only to $N_u$. Further, the adaptive control of the RF and Q is performed according to the following objectives: orthogonality between all users is maintained, and the total number of active sub-carriers is maximized. SF is also controlled adaptively to adjust the redundancy of transmitted data The total number of sub-carriers is given by the product of RF and Q. Thus when the total number of sub-carriers ($N_{sub}$) is constant, the product of RF and Q is also constant and equal to $N_{sub}$. Moreover, both RF and Q are integer values. In a first step of the present example 1, all the combinations of RF and Q that meet the objectives described above are predetermined. Each combination is also labelled with a rate index I defined by the following equation:

$$I=\log_2(Q)$$ Eqn. 4

Table 1 below shows an example of possible combinations in a case where $N_{sub}=512$.

TABLE 1 possible combination of RF and Q (for $N_{sub}$ = 512)

| | I | | | | | | | | | |
|---|---|---|---|---|---|---|---|---|---|---|
| | 0 | 1 | 2 | 3 | 4 | 5 | 6 | 7 | 8 | 9 |
| RF(I) | 512 | 256 | 128 | 64 | 32 | 16 | 8 | 4 | 2 | 1 |
| Q(I) | 1 | 2 | 4 | 8 | 16 | 32 | 64 | 128 | 256 | 512 |

In a second step of the present example 1, an optimal combination of RF and Q is selected for each user. The optimal combination of RF and Q maximizes the total number of active sub-carriers while maintaining orthogonality between all users. The total sum of Q for all users is tuned to $N_{sub}$, in order to maximize the total number of active sub-carriers, and to maintain orthogonality.

Figure 8:
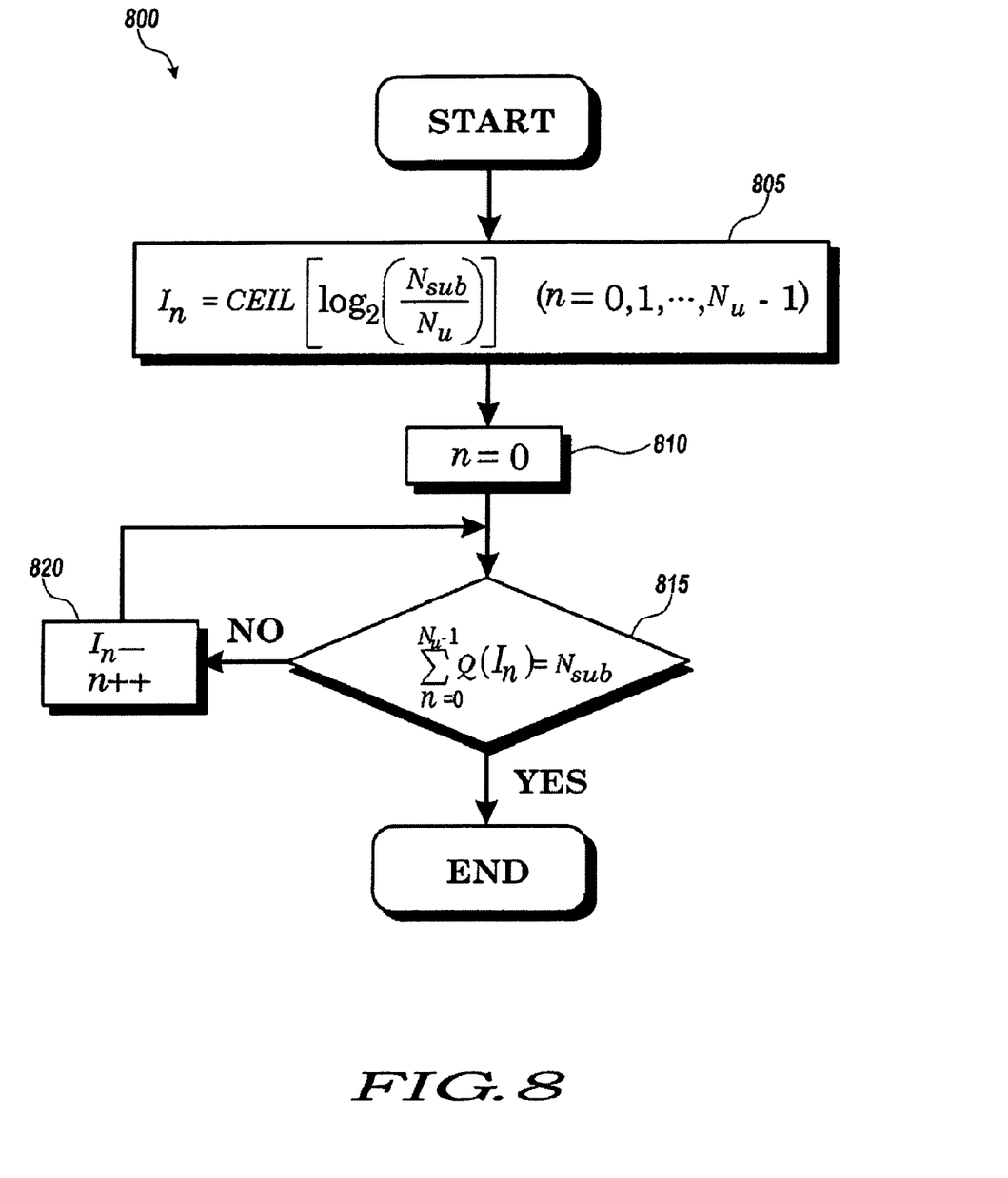
FIG. 8 is a flow diagram illustrating a process for selecting an optimal combination of RF and Q for each user of an IFDMA system according to an embodiment of the present invention.

Referring to FIG. 8 there is a flow diagram illustrating a process 800 for selecting an optimal combination of RF and Q for each user of a system 500 according to the present example 1. In the flow diagram, $I_n$ denotes a rate index for user n. The rate index for all of the users is first initialized at step 805 according to the following equation:

$$I_n = CEIL\left[\log_2\left(\frac{N_{sub}}{N_u}\right)\right] (n = 0, 1, \cdots, N_u - 1). \quad \text{Eqn. 5}$$

Next, at step 810, a user counter n is set to zero. At step 815 it is then determined whether the total sum of $Q(I_n)$ is equal to $N_{sub}$. If not, at step 820 the rate index is decremented by one user, and the process then loops until the total sum of $Q(I_n)$ becomes equal to $N_{sub}$. Eventually, $RF(I_n)$ and $Q(I_n)$ are selected for user n.

Generally, the number of active sub-carriers, which is equal to Q, is larger than the requested number of sub-carriers. In order to compensate for the difference, spreading is applied to the proposed system 500. A spreading factor for user n is determined by the following equation:

$$SF(n) = \frac{Q(I_n)}{W(n)}, \quad \text{Eqn. 6}$$

where, SF(n) and W(n) are the spreading factor and the requested number of sub-carriers for user n, respectively.

Examples of the RF, Q and SF for four different users as determined by the adaptive control process of example 1 is shown in Table 2. Here the number of users is equal to 4 and the total number of sub-carriers is fixed at 512. The total sum of Q is equal to $N_{sub}$, and because Q is constant across all users RF is also constant across all users.

TABLE 2

Examples of determined RF, SF and Q

|    | User 0 | User 1 | User 2 | User 3 |
|----|--------|--------|--------|--------|
| W  | 32     | 32     | 64     | 128    |
| RF | 4      | 4      | 4      | 4      |
| Q  | 128    | 128    | 128    | 128    |
| SF | 4      | 4      | 2      | 1      |

EXAMPLE 2

In a second example the RF and Q are adaptively controlled according to both $N_u$ and W. Further, the adaptive control of RF and Q is performed according to the following objectives: orthogonality between all users is maintained, the total number of active sub-carriers is maximized, and the number of active sub-carriers assigned to a user is proportional to the number of sub-carriers requested by the user. SF is also controlled adaptively to adjust the redundancy of transmitted data.

The present example 2 is similar to example 1 above except that the second step is changed. Here the number of active sub-carriers for each user, which is equal to Q, is proportional to the requested number of sub-carriers requested by the user.

Figure 9:
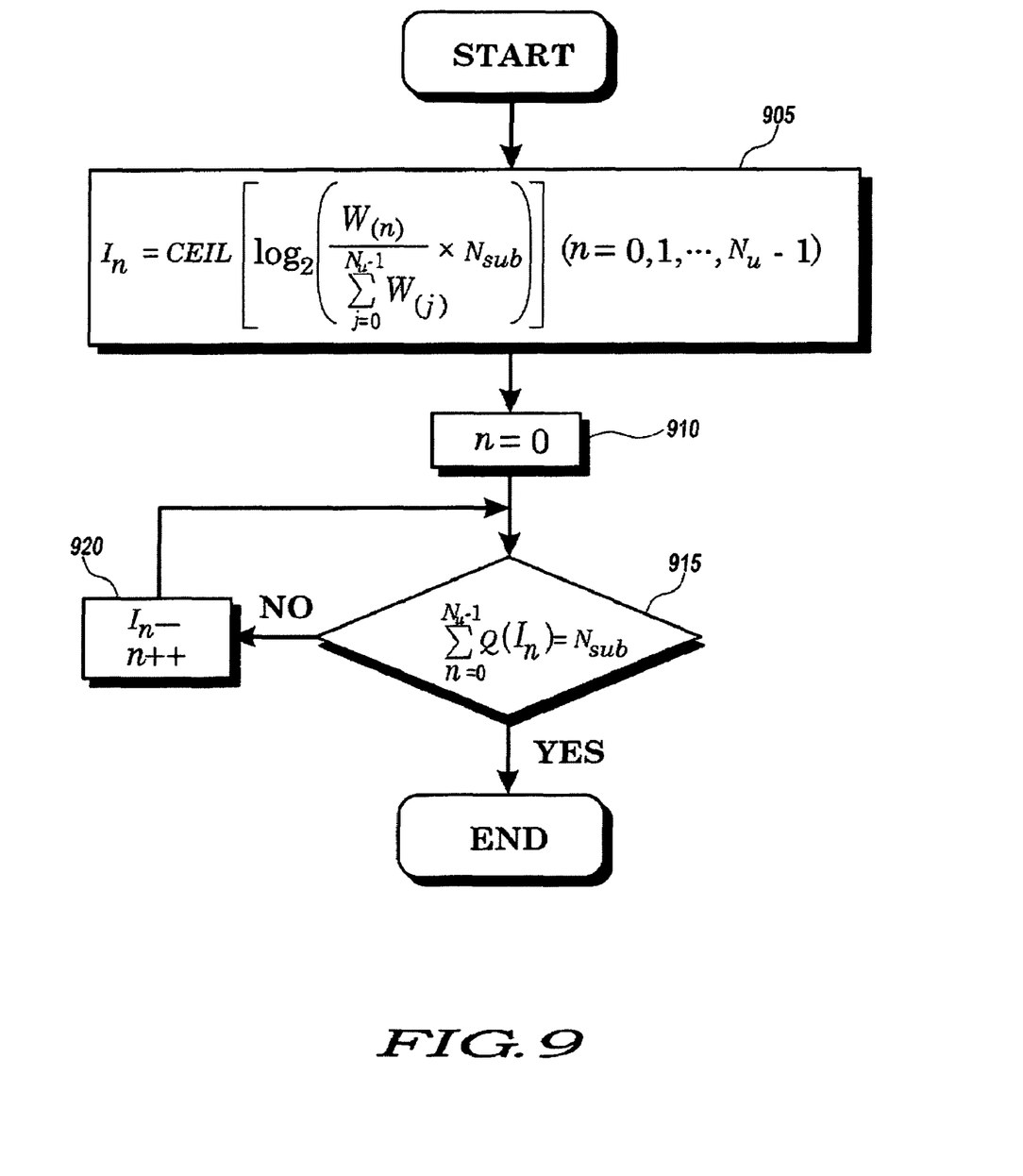
FIG. 9 is a flow diagram illustrating a process for selecting an optimal combination of RF and Q for each user of an IFDMA system according to another embodiment of the present invention.

Referring to FIG. 9 there is a flow diagram illustrating a process 900 for selecting an optimal combination of RF and Q for each user of a system 500 according to the present example 2. In the flow diagram, $I_n$ denotes a rate index for user n. The rate index for all of the users is first initialized at step 905 according to the following equation:

$$I_n = CEIL\left[\log_2\left(\frac{W(n)}{\sum_{j=0}^{N_u-1} W(j)} \times N_{sub}\right)\right] (n = 0, 1, \cdots, N_u - 1). \quad \text{Eqn. 7}$$

Next, at step 910, a user counter n is set to zero. At step 915 it is then determined whether the total sum of $Q(I_n)$ is equal to $N_{sub}$. If not, at step 920 the rate index is decremented by one user, and the process then loops until the total sum of $Q(I_n)$ becomes equal to $N_{sub}$. Eventually, $RF(I_n)$ and $Q(I_n)$ are selected for user n.

Examples of the RF, Q and SF for four different users as determined by the adaptive control process of example 2 is shown in Table 3. Here again the number of users is equal to 4 and the total number of sub-carriers is fixed at 512. Q is proportional to W, the total sum of Q is equal to $N_{sub}$, and SF is constant.

TABLE 3

Examples of RF, Q and SF

|    | User 0 | User 1 | User 2 | User 3 |
|----|--------|--------|--------|--------|
| W  | 32     | 32     | 64     | 128    |
| RF | 8      | 8      | 4      | 2      |
| Q  | 64     | 64     | 128    | 256    |
| SF | 2      | 2      | 2      | 2      |

Below are simulated Block Error Rate (BLER) performance data that compare a conventional IFDMA system according to the prior art with an IFDMA system 500 according to an embodiment of the present invention. For reference purposes the BLER performance of a prior art DS-CDMA system is also simulated. In the simulations the total number of sub-carriers and v were fixed at 512 and 64 respectively, and the chip rate was set to 32.768 Mcps. In the prior art IFDMA system, RF, SF and Q were fixed at RF=64, SF=1 and Q=8 regardless of the number of users. In the DS-CDMA system, RF, SF and Q were fixed to RF=1, SF=64 and Q=512 regardless of the number of users. For the system 500 according to the present invention, the values of RF, SF and Q for selected numbers of users are shown in Table 4 below.

TABLE 4

| $N_u$ | 1   | 2   | 4   | 8  | 16 | 32 | 64 |
|-------|-----|-----|-----|----|----|----|----|
| RF    | 1   | 2   | 4   | 8  | 16 | 32 | 64 |
| Q     | 512 | 256 | 128 | 64 | 32 | 16 | 8  |
| SF    | 64  | 32  | 16  | 8  | 4  | 2  | 1  |

The modulation in the simulations was QPSK, and Forward Error Correction (FEC) coding using turbo coding (K=4, $R_c=\frac{1}{2}$ and 256 bit block size) was used with Max Log-MAP decoding. The channel profile used in the simulation was a 12-path exponentially decayed propagation channel (442 ns RMS delay).

Figure 10:
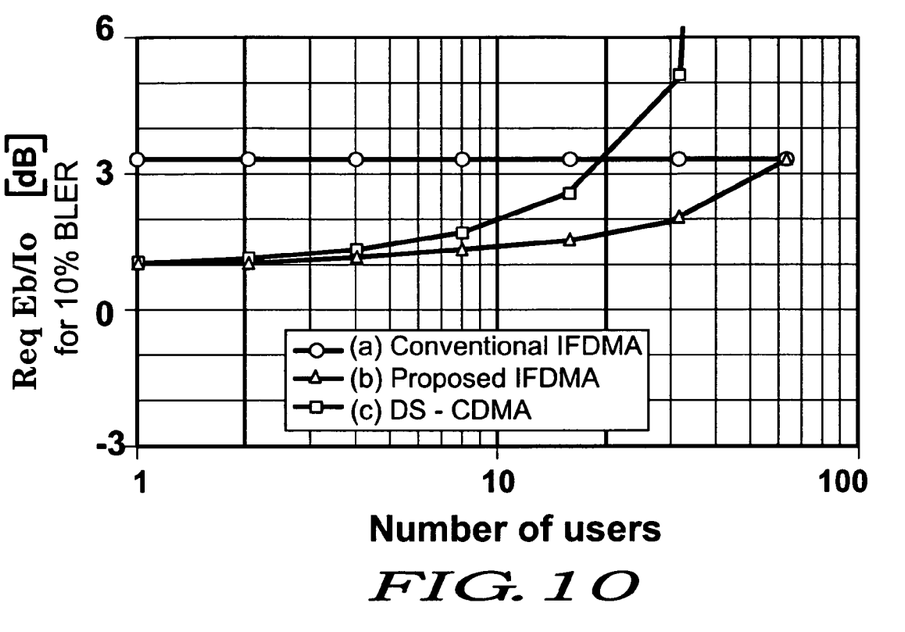
FIG. 10 is a graph illustrating simulated comparative performance data showing a required Eb/Io at 10% BLER for various numbers of users.
Figure 11:
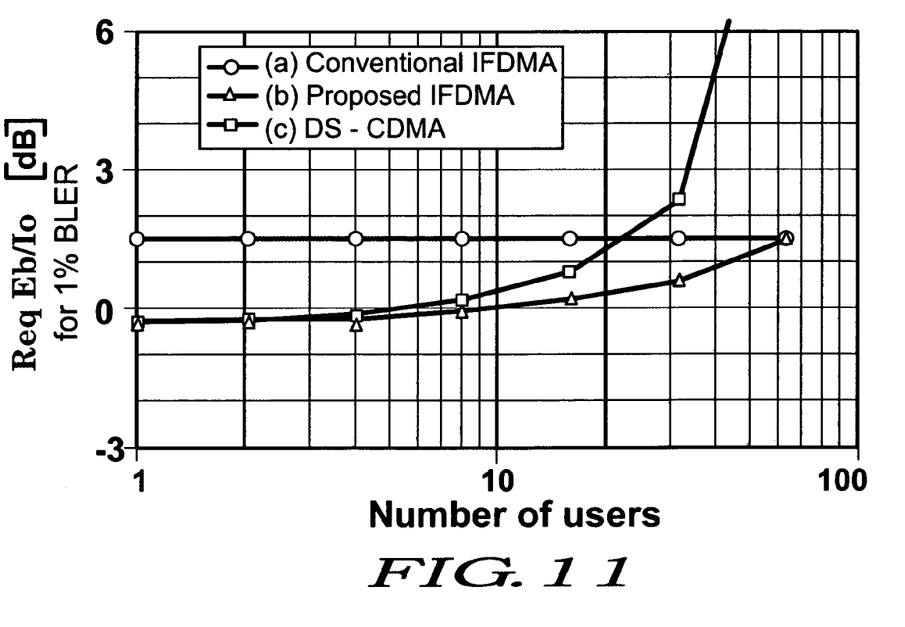
FIG. 11 is a graph illustrating simulated comparative performance data showing a required Eb/Io at 1% BLER for various numbers of users.

Referring to FIGS. 10 and 11 there are graphs illustrating the performance data from the simulations. The graphs show the number of users along the x-axis and the required information bit energy-to-interference plus background noise density ratio (Eb/Io) along the y-axis. FIG. 10 shows the required Eb/Io at 10% BLER and FIG. 11 shows the required Eb/Io at 1% BLER. Eb is the energy per bit and Io is the power spectral density of inter-cell interference modeled by additive white Gaussian noise. Those skilled in the art will recognize that, based on the above described simulation data, the IFDMA system 500 according to the present invention provides better performance over both the conventional IFDMA system and the DS-CDMA system, regardless of the number of users.

According to another embodiment of the present invention, the FEC coding rate may be adjusted instead of adjusting the SF. As described in more detail below, adjusting the FEC coding rate (using, e.g., turbo coding, convolutional coding, etc.) provides a similar effect as adjusting the SF.

Figure 12:
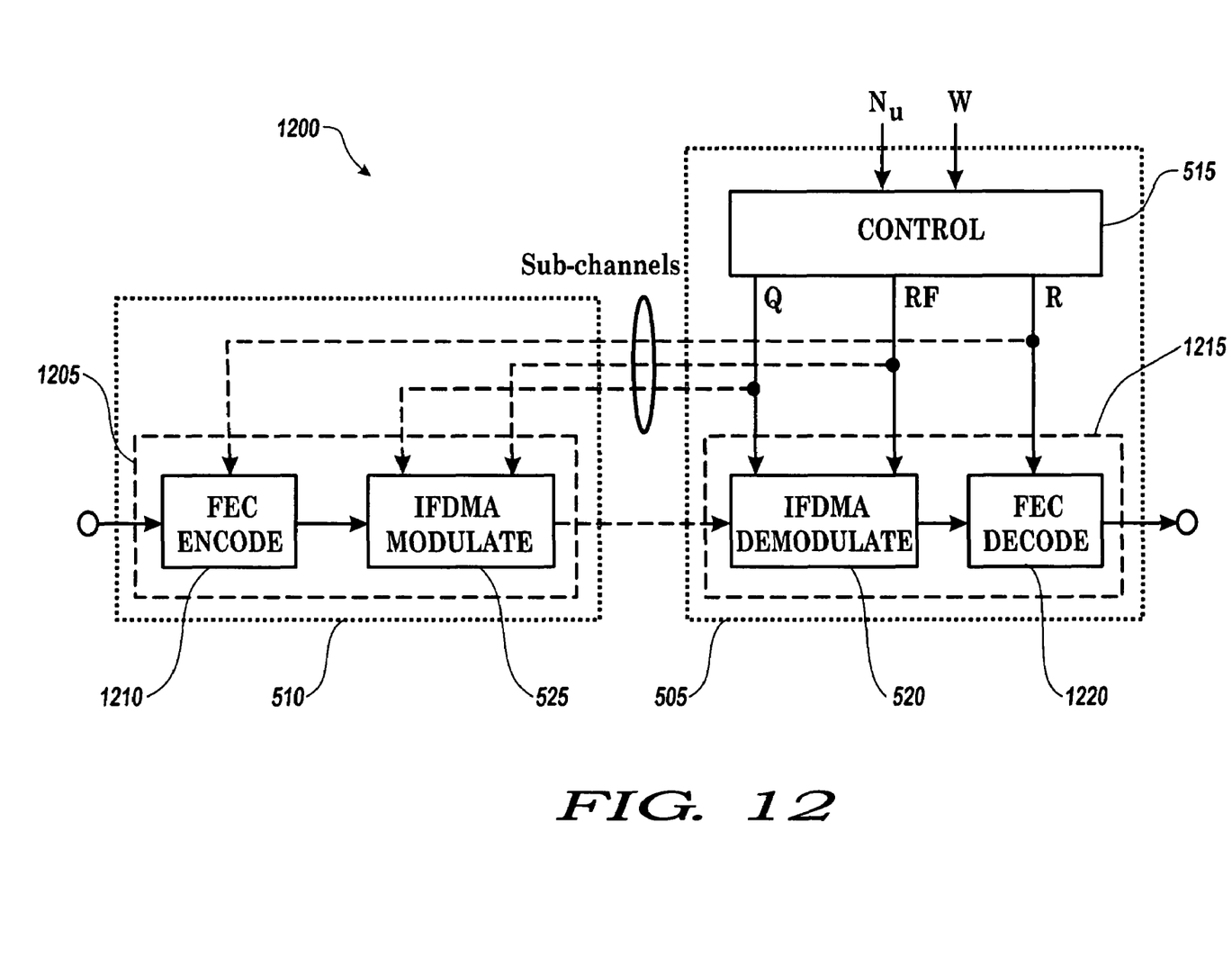
FIG. 12 is a schematic diagram of an IFDMA system according to an embodiment of the present invention that adjusts the coding rate based on a number of users ($N_u$)

Referring to FIG. 12 there is a schematic diagram of an IFDMA system 1200 according to an embodiment of the present invention that adjusts the coding rate based on the $N_u$. The IFDMA system 1200 is similar to the IFDMA system 500 described above, however additional components are illustrated. The additional components include a signal processor 1205 comprising an FEC encoder 1210 and an IFDMA modulator 525 at a mobile station 510. Also included is a signal processor 1215 comprising an FEC decoder 1220 and an IFDMA demodulator 520 at a base station 505. The FEC encoder 1210 and decoder 1220 are illustrated here to describe the use of a FEC coding rate parameter R that is provided from the controller 515.

When the FEC coding rate is adjusted as shown in FIG. 12, the RF and Q parameters still can be determined as described in either Example 1 or Example 2 above. However in addition an FEC coding rate R for user n is determined by the following equation:

$$R(n) = \frac{W(n)}{Q(I_n)}$$ Eqn. 8 where, R(n) is the FEC coding rate for user n.

Examples of the RF, Q, and R parameters for different users are shown in Table 5 below. Here RF and Q are determined as described in Example 1 above, where Q is constant across all users.

TABLE 5

Examples of RF, Q and R

|    | User 0 | User 1 | User 2 | User 3 |
|----|--------|--------|--------|--------|
| W  | 32     | 32     | 64     | 128    |
| RF | 4      | 4      | 4      | 4      |
| Q  | 128    | 128    | 128    | 128    |
| R  | ¼      | ¼      | ½      | 1      |

According to still another embodiment of the present invention, the modulation order may be adjusted instead of adjusting either the SF or R parameters. As described in more detail below, adjusting the modulation order (such as with QPSK, 16QAM, etc.) also provides a similar effect as adjusting the SF. Adjusting a modulation order is generally effective when Q is smaller than W.

Figure 13:
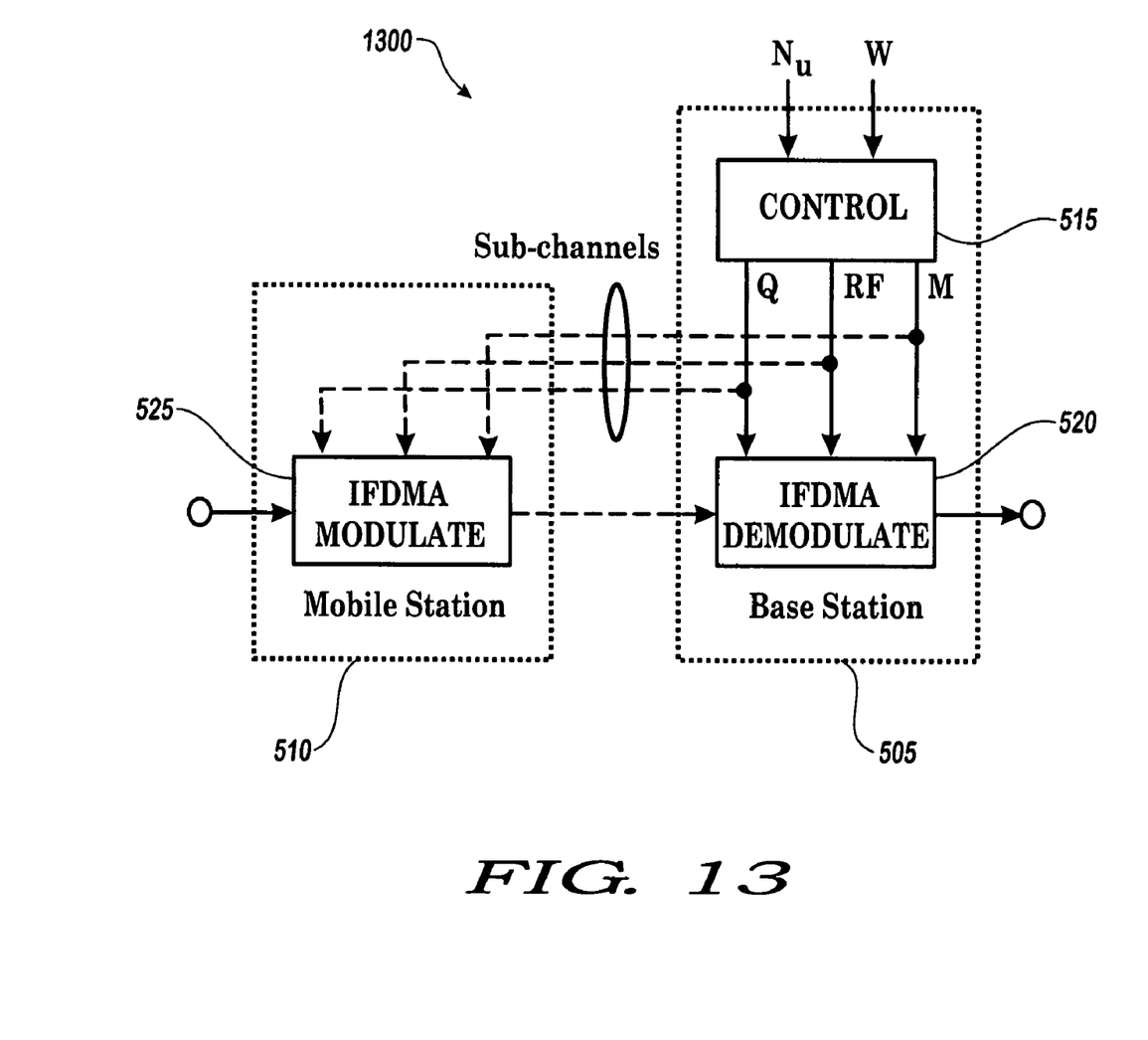
FIG. 13 is a schematic diagram of an IFDMA system according to an embodiment of the present invention that adjusts the modulation order based on $N_u$.

Referring to FIG. 13 there is a schematic diagram of an IFDMA system 1300 according to an embodiment of the present invention that adjusts the modulation order based on the $N_u$. The IFDMA system 1300 is similar to the IFDMA system 500 described above, however the controller 515 adjusts the modulation order parameter M instead of the SF parameter. The modulation order parameter M is then provided to both the I-Q modulator 110 and the I-Q demodulator 330 of the IFDMA modulator 525 and IFDMA demodulator 520, respectively.

When the modulation order is adjusted as shown in FIG. 13, the RF and Q parameters still can be determined as described in either Example 1 or Example 2 above. However in addition a modulation order M for user n is determined by the following equation:

$$M(n) = \frac{W(n)}{Q(I_n)}$$ Eqn. 9 where, M(n) is the number of bits per modulated symbol for user n (e.g., 1 for BPSK, 2 for QPSK, 4 for 16QAM).

Examples of the RF, Q, and M parameters for different users are shown in Table 6 below. Here RF and Q are again determined as described in Example 1 above, where Q is constant across all users.

TABLE 6

Examples of RF, Q and M

|    | User 0 | User 1 | User 2 | User 3 |
|----|--------|--------|--------|--------|
| W  | 256    | 256    | 512    | 128    |
| RF | 4      | 4      | 4      | 4      |
| Q  | 128    | 128    | 128    | 128    |
| M  | 2      | 2      | 4      | 1      |

Figure 14:
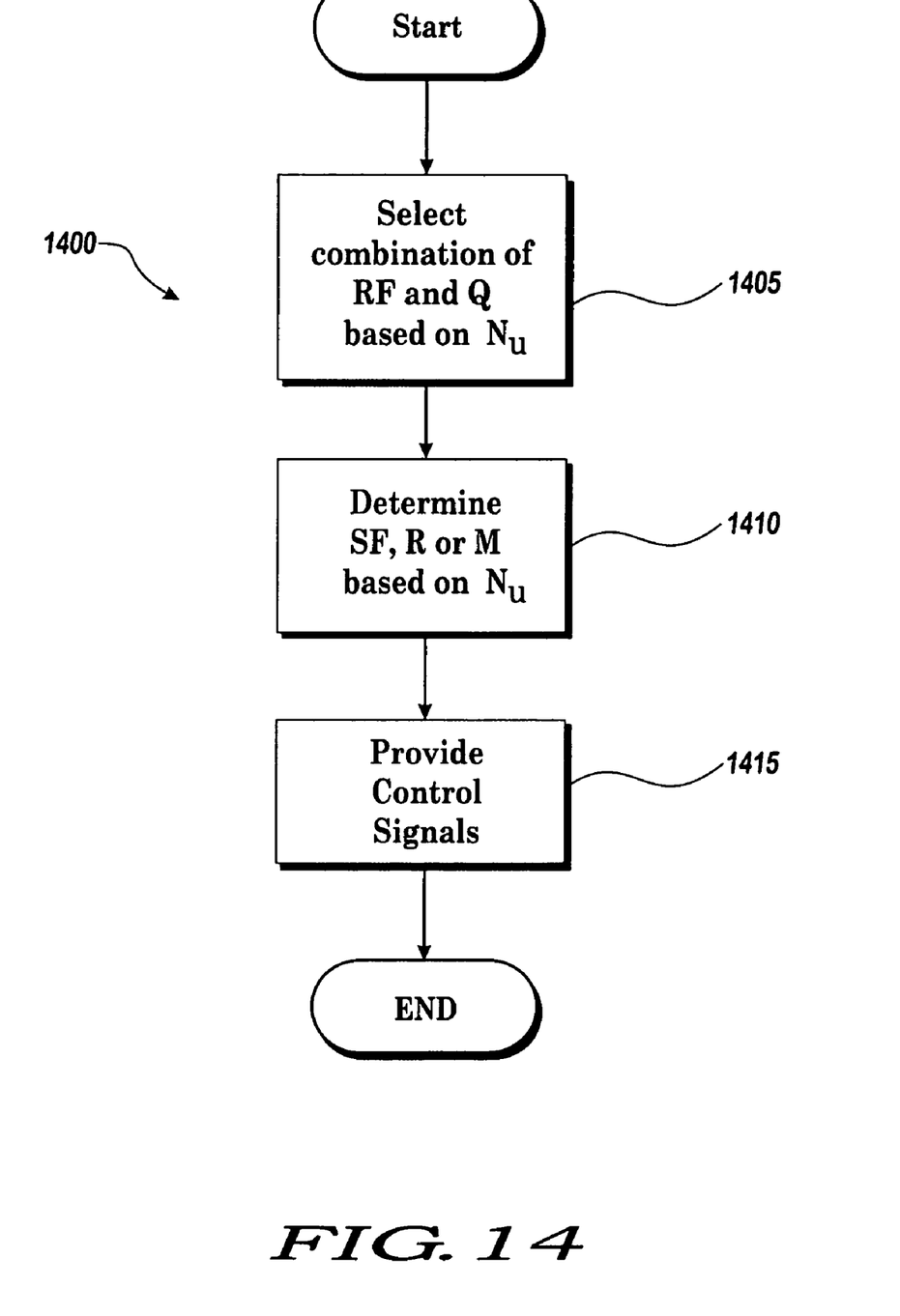
FIG. 14 is a flow diagram illustrating a method for adaptive control of sub-carriers according to an embodiment of the present invention.

In summary, referring to FIG. 14 there is a flow diagram illustrating a method 1400 for adaptive control of sub-carriers according to an embodiment of the present invention. First, at step 1405, a combination of a RF and a Q are selected from possible combinations of a RF and a Q. The combinations are selected based on either only $N_u$, or on both $N_u$ and W. Next, at step 1410, a SF, R, or M parameter is determined based on $N_u$. At step 1415 control signals are then provided, for example, as shown in FIG. 12, from a controller 515, to signal processors 1205, 1215 in a mobile station 510 and a base station 505, respectively.

Advantages of the present invention thus include overcoming a problem of the prior art where all possible sub-carriers are not used efficiently. The present invention enables capturing as much frequency diversity gain as possible while maintaining orthogonality between users. The increased frequency diversity gain then results in improved bit error rate performance.

It will be appreciated that embodiments of the invention described herein may be comprised of one or more conventional processors and unique stored program instructions that control the one or more processors to implement, in conjunction with certain non-processor circuits, some, most, or all of the functions of adaptive control of a number of sub-carriers in an IFDMA communication system 500 as described herein. The non-processor circuits may include, but are not limited to, a radio receiver, a radio transmitter, signal drivers, clock circuits, power source circuits, and user input devices. As such, these functions may be interpreted as steps of a method to perform adaptive control of sub-carriers. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

What is claimed is:

1. A method for providing control signals for adaptive control of sub-carriers comprising:
   selecting a combination of a Repetition Factor (RF) and a repetition block size (Q) from possible combinations of the RF and the Q based on a number of users ($N_u$) of an Interleaved Frequency Division Multiple Access (IFDMA) system;
   determining a Spreading Factor (SF), a Forward Error Correction (FEC) coding rate (R), or a modulation order (M) based on the $N_u$; and
   providing control signals for adaptive control of the sub-carriers based on the RF and Q, and based on the SF, R, or M.

2. The method of claim 1 wherein the combination of RF and Q is selected using the following equation:

$$I_n = CEIL\left[\log_2\left(\frac{N_{sub}}{N_u}\right)\right](n = 0, 1, \cdots, N_u - 1),$$

where $I_n$ denotes a rate index for a user n, and $N_{sub}$ is a total number of sub-carriers.

3. The method of claim 2 wherein the rate index is decremented by one user until the total sum of $Q(I_n)=N_{sub}$.

4. The method of claim 2 wherein an SF for the user n is determined by the following equation:

$$SF(n) = \frac{Q(I_n)}{W(n)},$$

where W(n) is a requested number of sub-carriers for the user n and $Q(I_n)$ is the repetition block size for the rate index for the user n.

5. The method of claim 2 wherein a coding rate R for the user n is determined by the following equation:

$$R(n) = \frac{W(n)}{Q(I_n)},$$

where R(n) is the FEC coding rate for the user n, $Q(I_n)$ is the repetition block size for the rate index for the user n, and W(n) is a requested number of sub-carriers for the user n.

6. The method of claim 2 wherein a modulation order M for the user n is determined by the following equation:

$$M(n) = \frac{W(n)}{Q(I_n)}$$

where M(n) is the number of bits per modulated symbol for the user n, $Q(I_n)$ is the repetition block size for the rate index for the user n, and W(n) is a requested number of sub-carriers for the user n.

7. The method of claim 1 wherein the combination of RF and Q is selected based on both $N_u$ and on a requested number of sub-carriers W(n) for a user n by a mobile station using the IFDMA system.

8. The method of claim 7 wherein the combination of RF and Q is selected using the following equation:

$$I_n = CEIL\left[\log_2\left(\frac{W(n)}{\sum_{j=0}^{N_u-1} W(j)} \times N_{sub}\right)\right](n = 0, 1, \ldots, N_u - 1),$$

where $I_n$ denotes a rate index for the user n, and $N_{sub}$ is a total number of sub-carriers.

9. The method of claim 8 wherein the rate index is decremented by one user until the total sum of $Q(I_n)=N_{sub}$.

10. An Interleaved Frequency Division Multiple Access (IFDMA) base station comprising:
    a controller adapted to provide a Repetition Factor (RF) and a repetition block size (Q) based on a number of users ($N_u$) of the base station, and also adapted to provide a Spreading Factor (SF), a Forward Error Correction (FEC) coding rate (R), or a modulation order (M) based on the $N_u$; and
    a signal processor adapted to receive the RF and Q, and the SF, R, or M from the controller so as to increase a number of active sub-carriers.

11. The base station of claim 10 wherein the provided RF and Q, and the SF, R, or M are transmitted using sub-channels from the base station to a signal processor in a mobile station.

12. The base station of claim 10 wherein the RF and Q are selected using the following equation:

$$I_n = CEIL\left[\log_2\left(\frac{N_{sub}}{N_u}\right)\right](n = 0, 1, \ldots, N_u - 1),$$

where $I_n$ denotes a rate index for a user n, and $N_{sub}$ is a total number of sub-carriers.

13. The base station of claim 12 wherein the rate index is decremented by one user until the total sum of $Q(I_n)=N_{sub}$.

14. The base station of claim 12 wherein an SF is determined by the following equation:

$$SF(n) = \frac{Q(I_n)}{W(n)},$$

where W(n) is a requested number of sub-carriers for the user n and $Q(I_n)$ is the repetition block size for the rate index for the user n.

15. The base station of claim 12 wherein a coding rate R is determined by the following equation:

$$R(n) = \frac{W(n)}{Q(I_n)}$$

where R(n) is the FEC coding rate for the user n, $Q(I_n)$ is the repetition block size for the rate index for the user n, and W(n) is a requested number of sub-carriers for the user n.

16. The base station of claim 12 wherein a modulation order M for the user n is determined by the following equation:

$$M(n) = \frac{W(n)}{Q(I_n)}$$

where M(n) is the number of bits per modulated symbol for the user n, $Q(I_n)$ is the repetition block size for the rate index for the user n, and W(n) is a requested number of sub-carriers for the user n.

17. The base station of claim 10 wherein the RF and Q are selected based on both $N_u$ and on a requested number of sub-carriers W(n) for a user n by a mobile station that is in radio communication with the base station.

18. The base station of claim 17 wherein the RF and Q are selected using the following equation:

$$I_n = CEIL\left[\log_2\left(\frac{W(n)}{\sum_{j=0}^{N_u-1} W(j)} \times N_{sub}\right)\right] (n = 0, 1, \ldots, N_u - 1),$$

where $I_n$ denotes a rate index for the user n, and $N_{sub}$ is a total number of sub-carriers.

19. The method of claim 18 wherein the rate index is decremented by one user until the total sum of $Q(I_n) = N_{sub}$.

20. An Interleaved Frequency Division Multiple Access (IFDMA) system for providing control signals for adaptive control of sub-carriers comprising:

means for selecting a combination of a Repetition Factor (RF) and a repetition block size (Q) from possible combinations of the RF and the Q based on a number of users ($N_u$) of the system;

means for determining a Spreading Factor (SF), a Forward Error Correction (FEC) coding rate (R), or a modulation order (M) based on the $N_u$; and means for providing control signals for adaptive control of the sub-carriers to signal processors based on the RF and Q, and based on the SF, R or M.

* * * * *